United States Patent [19]
Hensel

[11] Patent Number: 5,304,757
[45] Date of Patent: Apr. 19, 1994

[54] COMBINATION DIFFERENTIAL AND STATIC PRESSURE SWITCH

[75] Inventor: Frederick W. Hensel, Butler, Pa.

[73] Assignee: Tech Team, Inc., Butler, Pa.

[21] Appl. No.: 858,069

[22] Filed: Mar. 26, 1992

[51] Int. Cl.$^5$ ............................................. H01H 35/38
[52] U.S. Cl. ................................ 200/82 R; 200/82 E
[58] Field of Search ................ 200/82 R, 82 B, 82 C, 200/82 D, 82 DA, 82 A, 82 E

[56] References Cited

U.S. PATENT DOCUMENTS

| | | | |
|---|---|---|---|
| 3,766,779 | 10/1973 | Hoffman | 73/228 |
| 4,166,936 | 9/1979 | Tice | 200/82 E |
| 4,519,256 | 5/1985 | Daniels | 200/82 A X |
| 4,962,831 | 10/1990 | Dundas | 200/82 E |
| 5,046,313 | 9/1991 | Crumb et al. | 200/82 D X |

Primary Examiner—J. R. Scott
Attorney, Agent, or Firm—George C. Atwell

[57] ABSTRACT

A combination differential and static pressure switch utilized in a test system for detecting the occurrence of a differential pressure condition within the test system. The test system includes a valve assembly in flow communication with the pressure switch for determining the working pressure applied to a workpiece being tested. The pressure switch includes a first tubular-shaped member and a second tubular-shaped member axially aligned therewith and adapted for removable securement to the first tubular-shaped member. A differential piston is disposed for slidable reciprocal movement within the first tubular-shaped member and a preset piston is disposed within the second tubular-shaped member and is adapted for slidable reciprocal movement therein. Both pistons are axially aligned to each other, and the differential piston has a magnet mounted to the face end thereof. An elongated passage extends substantially into and through the second tubular-shaped member and a cylindrical support member is adapted for removable and adjustable placement within the passage. A reed switch is emplaced within the support member and is actuated by the proximity of the magnetic field of the magnet. The reed switch is actuated to a signaling, conducting state when the magnetic field is proximate thereto; and when a differential pressure occurs within the test system, the differential piston backs away from the preset piston upon detecting the differential pressure, thus disposing the reed switch to a nonsignaling state indicating that the workpiece has failed the test.

10 Claims, 7 Drawing Sheets

COMBINATION DIFFERENTIAL AND STATIC PRESSURE SWITCH

BACKGROUND OF THE INVENTION

The present invention relates to pressure responsive switches, and more particularly pertains to a combination differential and static pressure switch for determining a minimum static pressure within a test system, and also for detecting when a differential pressure condition occurs within the test system.

For a variety of industrial purposes the working pressure of pipe, such as drill pipe, gas pipe, plastic pipe, and water pipe, etc., must be accurately measured and tested to determine their reliability and structural integrity during their working life. In addition, the standard working pressure of plastic containers and glass bottles must also be measured and determined in order to determine their reliability and structural integrity during their working life. In fact, it can be broadly stated that any item of manufacture in commerce that has the possibility of breaking, rupturing, and splitting, thus causing a leak, can be measured to determine their standard working pressure and psi. rating.

A prominent method of measuring and determining the standard working pressure of a workpiece, such as the above-mentioned items, is by a time-to-failure test. The workpiece is held at a constant pressure at a predetermined psi. for a given time period so that data points can be collected. What is being measured is hoop stress: the stress generated in the workpiece by pressure being exerted thereon and occurring along the circumference of the workpiece during the testing. Hoop stress is the force that attempts to tear apart and split the pressurized pipe or tubing when the pipe is subjected to pressure.

As an example of a time-to-failure test, if seven pieces of industrial pipe are held at 600 psi., they may fail in ten hours; if six pieces of industrial pipe are held at 400 psi., they may fail in one hundred hours; and, if six more pieces of industrial pipe are held at 300 psi., they may fail after one thousand hours. By calculating out this curve, it can be determined that the industrial pipe being tested at a working pressure of 200 psi. will last fifty years. Therefore, if the working pressure is limited to 200 psi. based on the above curve calculation, the industrial pipe will last fifty years. The industrial pipe can be rated at 200 psi. and sold as a 200 psi. pipe. Furthermore, data points are collected along the curve which is developed during pipe testing, and then a line is drawn through all the data points; this represents a statistical analysis of the failure points. By determining how wide the data point spread is, confidence limits can be ascertained for the particular industrial pipe being tested at a predetermined psi. for a given time period. Essentially, the pipe is being tested for a leak, and some tests are timed to run for years.

The above-described test is not a production test; it is an experimental test. The test is undertaken to determine when the workpiece fails. The test continues until the workpiece fails —the workpiece develops a detectable leak while being held at a predetermined constant pressure. Also, it should be noted that this is destructive testing: the workpiece to be tested is chopped off, tested, and then discarded after the testing is completed. The differential pressure switches used in such testing are only one component of a larger test system which includes metering valves, a pumping unit, regulators, pressure gauges, control panels, and a visual display in the form of LED lights or a computer display screen.

While the prior art discloses a number of pressure switches used in pressure testing, there is a need for a differential pressure switch which detects both a differential and the static pressure condition and also has an extremely high degree of repeatability and a high degree of accuracy. In addition, there remains a need for a differential pressure switch which is responsive to a high pressure and a low differential as well as a low pressure and a low differential.

SUMMARY OF THE INVENTION

The present invention comprehends a pressure switch which is adapted to detect a minimum static pressure existent within a test system and a differential pressure occurring within the test system as a result of failure of a workpiece to sustain a predetermined test pressure. The pressure switch is adapted to detect both a condition when no differential exists within the test system, and also a condition when a differential pressure exists within the test system.

The combination differential and static pressure switch of the present invention is one component within the test system, and is plumbed into the test system. The workpiece being tested, which can include various types of industrial pipe, glass bottles, plastic containers, etc., is also plumbed into the test system and in flow communication with the pressure switch. The workpiece is held at a constant, predetermined, working pressure until it fails, i.e., until the workpiece develops a leak. A valve assembly or valve arrangement is also part of the test system and is in flow communication with the pressure switch and, indirectly, the workpiece being tested. When the workpiece develops a leak a differential pressure occurs across an orifice which is part of the valve assembly or arrangement, and this differential pressure is detected by the pressure switch indicating that the workpiece has failed the test.

The pressure switch of the present invention includes a first tubular-shaped member which is closed at a first distal end and has an opposite open annular second end and an inner bore extending substantially therethrough from the first end to the open second end. An inlet passage located adjacent the closed end extends from the inner bore to the outer surface of the first tubular-shaped member and is in flow communication with the inner bore. Fluid flow from an external source enters the inlet passage and flows into the inner bore. The first tubular-shaped member also includes an outlet passage which extends from the inner bore to the outer surface and is in flow communication with the inner bore. The outlet passage is located adjacent the open annular second end and permits flow outwardly from the inner bore.

Disposed within the inner bore of the first tubular-shaped member is a differential piston which has a face end and an opposite seating end. The differential piston is adapted for slidable reciprocal linear movement within the bore of the first tubular-shaped member and is concentric with the bore. The differential piston detects a differential pressure condition occurring within the test system. Mounted to the face end of the differential piston is a magnet for producing a local magnetic field. A cup-shaped plastic cap is tightly affixed over the magnet and mounted into the face end of the differential piston to protect the magnet from the effects of corrosive fluids and chemicals. The first tubular-shaped member includes an annular cup seal mounted within the inner bore adjacent the open annular second end, and a cylindrical guide ring mounted to the differential piston adjacent the seating end thereof. The guide ring is interposed between the surface of the differential piston and the inner bore, and thus assists in minimizing the corrosive effects that could result from slidable movement of the differential piston against the inner bore. In effect, the differential piston rides upon the guide ring and the cup seal during slidable movement within the inner bore and does not contact the inner bore due to the interposition of the guide ring and the cup seal therebetween.

The pressure switch of the present invention also includes a first spring biasing means; more specifically, the first biasing means comprehends a first compression spring seated within the inner bore adjacent the closed first end of the first tubular-shaped member which is adapted for yieldably compressing and resisting when a differential pressure condition forces the differential piston to move toward the closed first end as the differential pressure condition overcomes the tension of the first compression spring.

Axially aligned with the first tubular-shaped member, and adapted for removable securement thereto, is a second tubular-shaped member. The second tubular-shaped member has an annular projecting rim having a smaller diameter than the second tubular-shaped member and is adapted to mate with and securely fit within the open annular second end of the first tubular-shaped member. When the first and second tubular-shaped members are disposed in their operative positions, a watertight and airtight fitting of the annular rim within the open annular second end is achieved. The second tubular-shaped member further includes a substantially closed distal end, a centrally-located elongated passage extending from the distal end substantially into the second tubular-shaped member and concentric therewith, and a cylindrical chamber located between the elongated passage and the annular rim. The cylindrical chamber of the second tubular-shaped member has a slightly smaller diameter than the inner bore of the first tubular-shaped member.

Disposed within the cylindrical chamber is a pre-set piston. The preset piston is adapted for slidable reciprocal movement within the cylindrical chamber and the annular rim and this slidable movement is in axial alignment with the slidable movement of the differential piston. The pre-set piston is utilized by the test system to register a minimum predetermined static pressure within the test system. This is necessary to determine whether or not the workpiece is under a test pressure; before testing of a workpiece can occur the test system must be brought up to a minimum predetermined static test pressure, and this can be visually monitored and checked by an operator visually checking a pressure gauge to ascertain when the pressure within the test system is at the predetermined test pressure. This function can also be computerized. Because the differential piston only detects when a differential pressure is occurring within a test system, it cannot detect whether there is a minimum predetermined pressure within the test system or whether the test system is unpressurized and no pressure is being exerted on the workpiece. This could lead to false results in that the differential piston could be disposed so that the test system would be registering no differential pressure but, in fact, the test system has not been brought up to the minimum test pressure as a result of operator omission or equipment failure.

A cylindrical, elongated support member, which can be, for example, a tubular aluminum sheath or sleeve, is adapted for removable and adjustable placement within the elongated passage and projects substantially into the cylindrical chamber when the support member is disposed in its operative position. In addition, the support member is partially encompassed by the pre-set piston when the second tubular-shaped member is disposed in its operative position of securement to the first tubular-shaped member. A second spring biasing means which includes a second compression spring is disposed within the cylindrical chamber circumjacent to a portion of the support member projecting into the cylindrical chamber and, further, the second compression spring is substantially encompassed by and fits within the pre-set piston. The second compression spring is adapted to yieldably resist and extend, thus facilitating the slidable reciprocal movement of the pre-set piston within the second tubular-shaped member, depending on whether no minimum pressure exists within the system, a minimum pressure exists but no differential pressure condition exists, or a differential pressure condition exists within the test system.

An electrical signaling means, which in the present invention is a reed switch, is emplaced within the support member so that electrical signaling is actuated by the proximity of the magnetic field of the magnet to the electrical signaling means. The reed switch is emplaced so that it extends all the way into the support member and is adjacent the inside face of the pre-set piston. When the magnetic field of the magnet affixed to the differential piston causes the metallic fingers or springs of the reed switch to come in contact, then the reed switch is in the signaling, conducting on state. This indicates that no pressure differential is occurring within the test system. When a leak occurs within the test system and is detected by the differential piston, the differential piston will back away from the pre-set piston toward the closed first end of the first tubular-shaped member. With the magnetic field of the magnet now falling off, the metallic fingers or springs of the reed switch will open up and the reed switch will be in a nonconducting, nonsignaling off state. This causes the reed switch to go off thus indicating that the test has failed and a differential pressure has occurred within the test system and has been detected by the differential piston. The positioning of the support member within the elongated passage can be adjusted to alter the sensitivity of the reed switch and also to achieve different settings.

It is an objective of the present invention to provide a pressure switch which can detect a predetermined minimum pressure within a test system as well as a differential pressure occurring therein.

It is another objective of the present invention to provide a pressure switch which can be used for a wide variety of applications wherein a substance or material is placed under a given test pressure and a leak occurs which is detectable by the pressure switch.

Yet another objective of the present invention is to provide a pressure switch which has extreme sensitivity in detecting differential pressures ranging from very low pressures to extremely high pressures.

Another objective of the present invention is to provide a pressure switch which is easy to manufacture and maintain, and yet achieves a high degree of accuracy and repeatability over a succession of test situations.

These and other objects and advantages of the present invention will become more apparent when reference is made to the following detailed description and the accompanying drawings.

DETAILED DESCRIPTION OF THE PREFERRED EMBODIMENT

Figure 1:
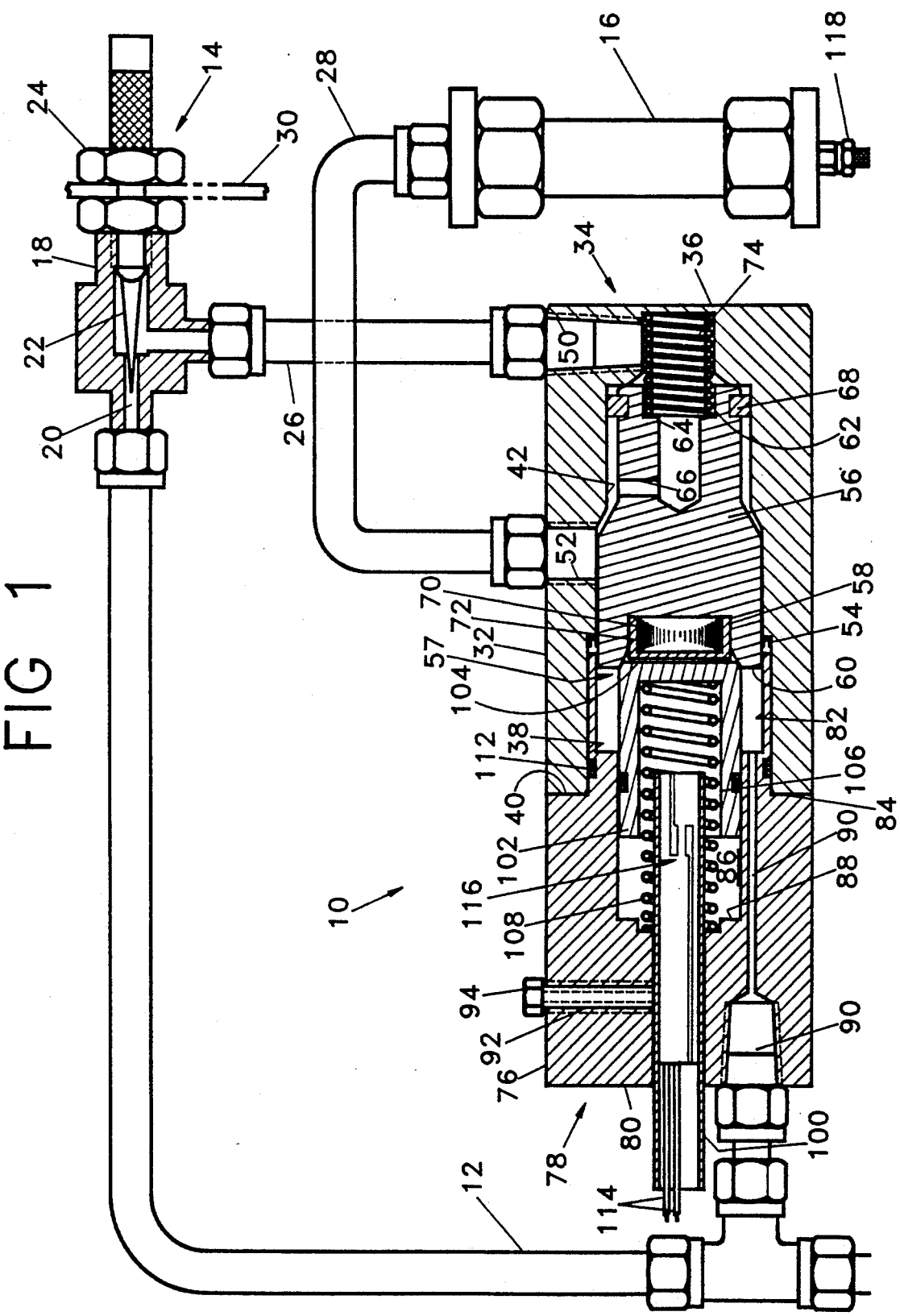
FIG. 1 is a cross-sectioned elevational view of the pressure switch the present invention.

FIGS. 1-4 illustrate a preferred embodiment of a combination differential and static pressure switch 10 for detecting the occurrence of a differential pressure condition in a test pressure system. The pressure switch 10 of the present invention is used to detect a minimum predetermined static pressure existing within the test system, a condition in which there is no differential in pressure in the test system, and a condition in which a differential pressure condition exists within the test system. The test system itself comprises a number of structural elements and components which include an inlet feeder pipe 12 in flow communication with a valve assembly 14, the pressure switch 10, and a workpiece 16 to be tested. In addition, the test system is part of a larger pressure testing equipment apparatus (not shown). More specifically, the valve assembly 14 is a metering valve 18 having an orifice 20, a needle 22, and a means to calibrate and regulate the flow across the orifice 20. The metering valve 18 is conventional in the art and is adapted to control gas and liquid flow rates accurately and precisely in laboratory testing or field use. By adjusting a handle 24 on the valve 18, the orifice 20 can be set to a variety of different flow rates, and micrometers can be used to calibrate the various flow rates and settings of the valve 18. A valve with a fixed orifice can also be used. With regard to the pressure switch 10, the set point is two turns open, i.e., two thread pitches open. The orifice 20 attained when the valve 18 is at set point is measured in order to ascertain if the handle 24 is properly set on; if the handle 24 is not set on right, then the handle 24 must be reset. The test system also includes intermediate piping 26 connected between the valve assembly 14 and the pressure switch 10, and outlet piping 28 going from the pressure switch 10 to the workpiece 16 being tested. The workpiece 16 and the valve assembly 14 are shown for illustrative purposes only; the switch 10 and associated piping would be located behind a panel 30 with only the handle 24 of the valve 18 exposed to an operator. The size of the workpiece 16 may vary and would be larger than the switch 10.

Illustrated in FIGS. 1-4 is the workpiece 16 which can include drill pipe, gas pipe, plastic pipe, water pipe, and plastic or glass containers of various sizes. Applications for the pressure switch 10 include any item that has the possibility of breaking, rupturing, splitting, and causing a leak. The workpiece 16 is held at a predetermined constant pressure (the actual pressure to which the workpiece is subjected is denoted by the term "hoop stress") for a given period of time until a leak develops; these are timed tests and some tests can run for years. The pressure switch 10 can be used in nonlubricating media such as water or air and can be used with any type of fluid but the pressure switch 10 does not rely on oil for lubrication. The inlet feeder pipe 12 on the left-hand side of FIGS. 1-4 is in flow communication with a pumping system (not shown) and is the high pressure side when a differential pressure has occurred within the test system, and the intermediate piping 26 and outlet piping 28 on the right-hand side generally of FIGS. 1-4 is the low pressure side when a differential pressure has occurred within the test system. The workpiece 16 is tested until it fails, i.e., until the workpiece 16 develops a leak detectable by the pressure switch 10. This is destructive testing in that the workpiece 16 is chopped off, tested, and then eventually thrown away.

The pressure switch 10, as shown in FIGS. 1-4, includes a first tubular-shaped member 32 having an elongated and cylindrical body or structure, and preferably manufactured from brass. The first member 32 has a closed distal first end 34 having a flat, cylindrical face 36 and an opposite open annular second end 38 having a flat rim 40. Extending therethrough from the first end 34 to the rim 40 of the second end 38 is an inner bore 42 which defines an elongated cavity 44. The inner bore 42 is not of a uniform diameter along its length but is stepped at several points therealong. The inner bore 42 terminates internally at an annular seat 46 located and adjacent the first end 34. The seat 46 forms a cylindrical recess 48 within the first member 32 and has a smaller diameter than the inner bore 42. An inlet passage 50 is formed in the body of the first member 32 from the seat 46 to the surface of the first member 32 and is located adjacent the first end 34 thereof. The inlet passage 50 is adapted to receive at its end terminating on the body of the first member 32 various pipe fittings, such as the intermediate piping 26, and the inlet passage 50 is adapted to allow flow from the intermediate piping 26 into the recess 48 and the cavity 44 of the inner bore 42. In addition, the first member 32 includes an outlet passage 52 formed within and extending through the body of the first member 32 and located adjacent the second end 38. The outlet passage 52 is located at approximately the mid-point between the rim 40 of the second end 38 and the exterior face 36 of the first end 34. The outlet passage 52 is also adapted to receive the outlet piping 28 and for allowing flow communication from the cavity 44 to the outlet piping 28. The outlet passage 52 is more specifically adapted for permitting outward flow from the cavity 44 of the inner bore 42.

Figure 2:
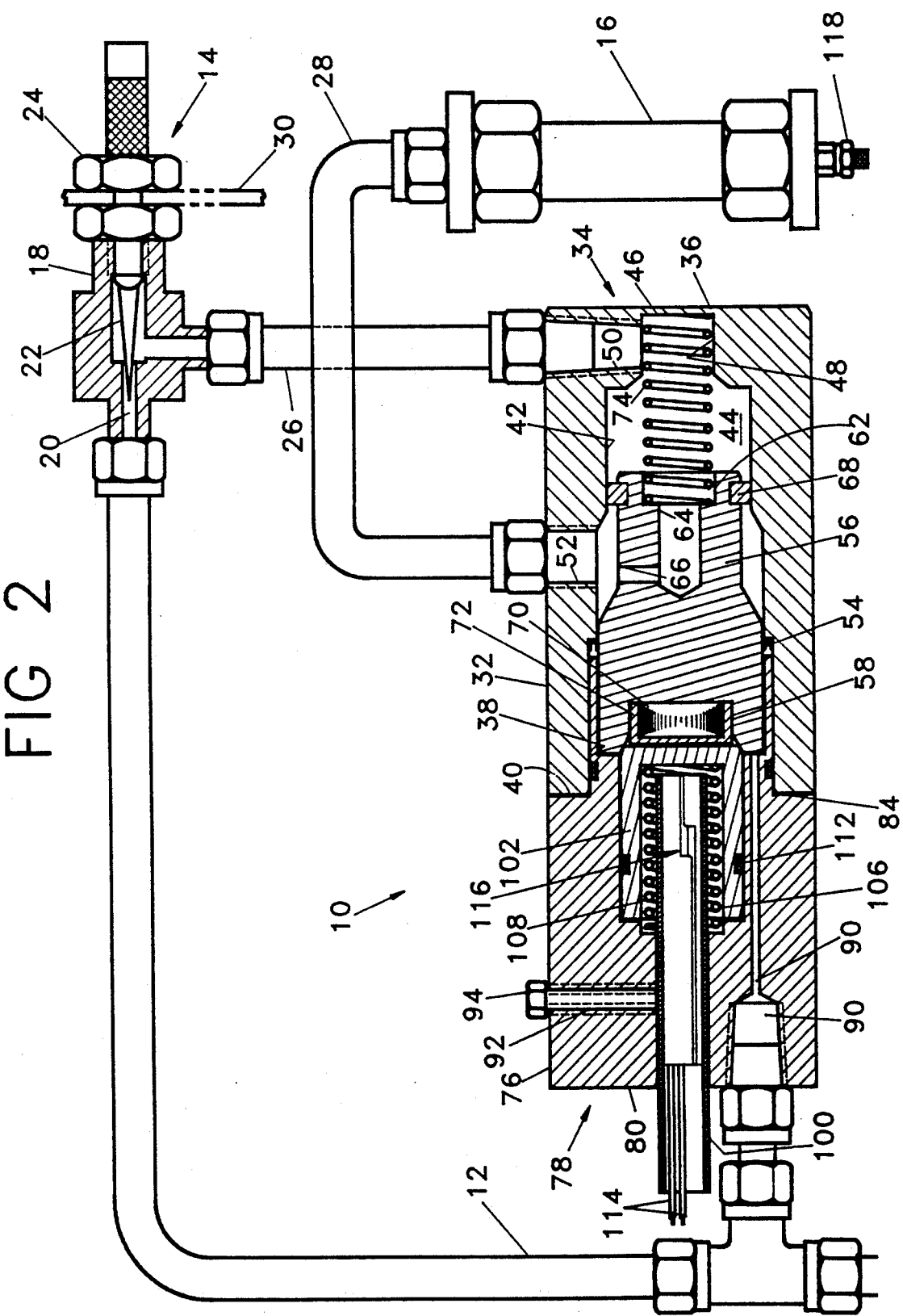
FIG. 2 is a cross-sectioned elevational view of the switch first shown in FIG. 1.
Figure 3:
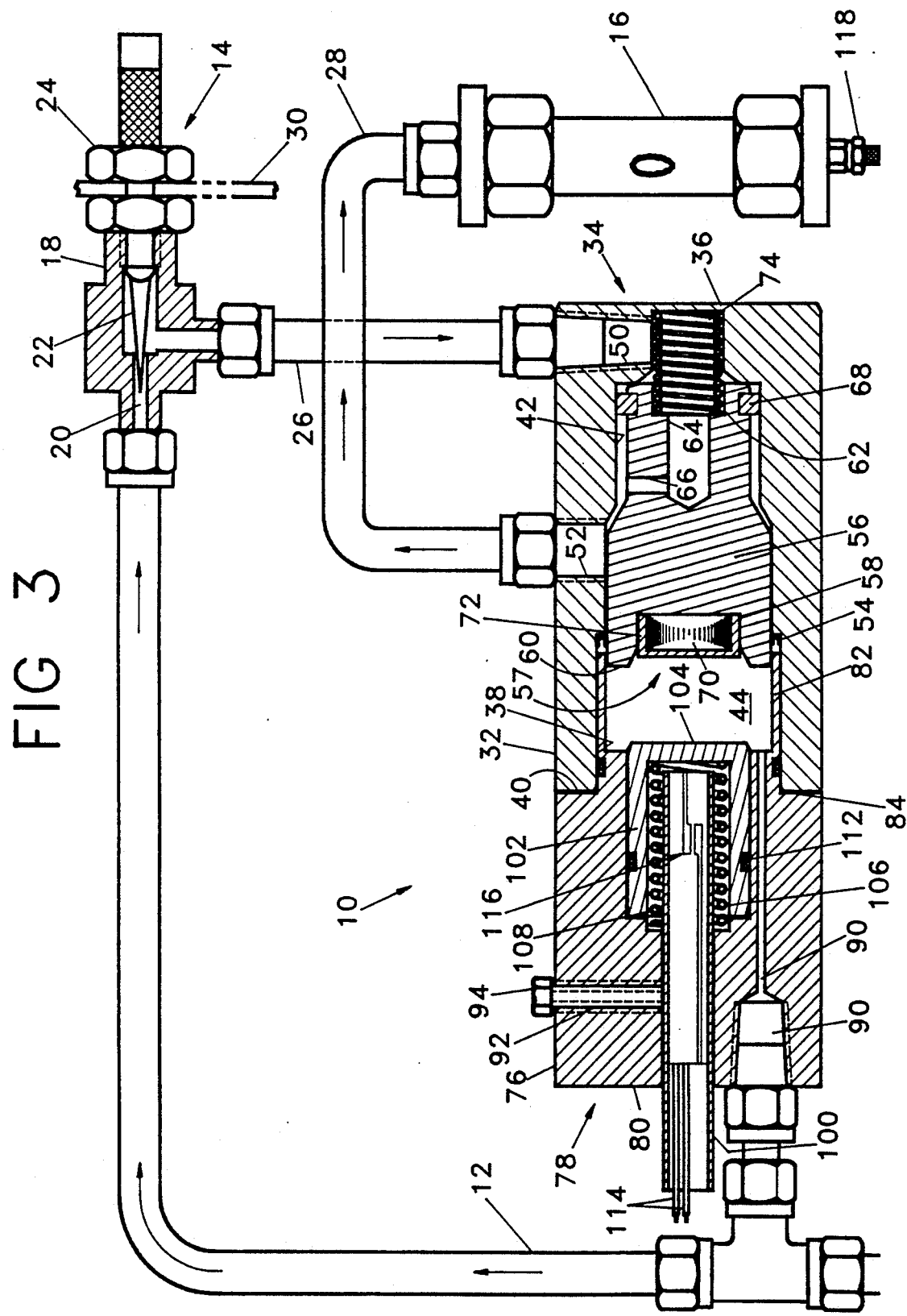
FIG. 3 is a cross-sectioned elevational view of the switch first shown in FIG. 1 illustrating a leak condition detected by the switch.
Figure 4:
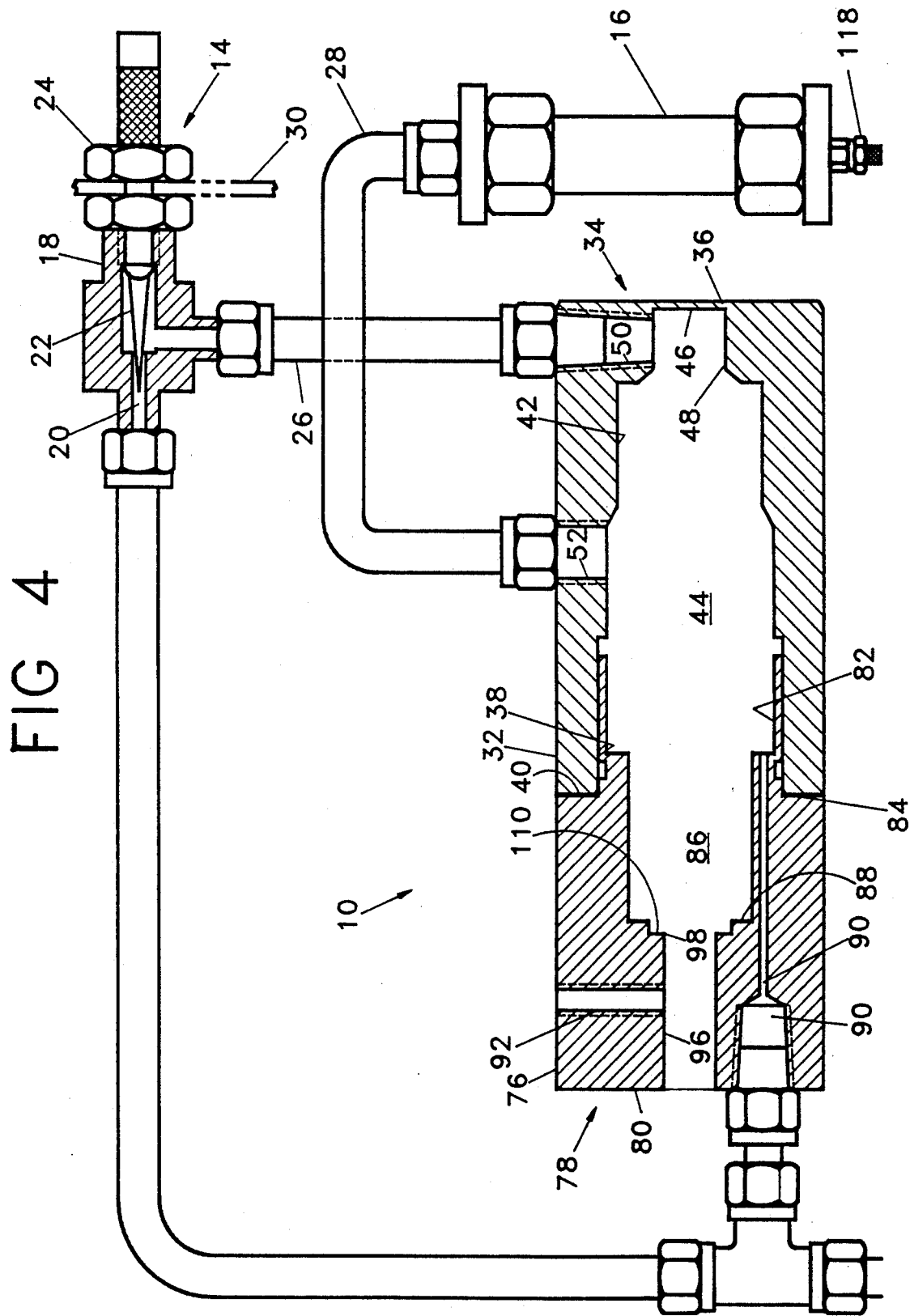
FIG. 4 is a cross-sectioned elevational view of the switch first shown in FIG. 1 with certain internal structural components removed.

As shown in FIGS. 1-3, a cylindrical cup seal 54 is mounted within the inner bore 42 adjacent the second end 38. The cup seal 54 is of a non-ferrous, non-corrosive material, such as plastic, and is mounted within the inner bore 42 at a point where the inner bore 42 steps down from one diameter to a slightly smaller diameter. The cup seal 54 is generally impervious to fluid flow and is adapted to reduce and minimize galvanic corrosion of the first member 32, as shall be hereinafter described.

As shown in FIGS. 1-4, a stainless steel differential piston 56 is positioned within the inner bore 42 of the first member 32 and is adapted for slidable, reciprocable, axial movement therein. The piston 56 is adapted to detect when a differential pressure condition has occurred within the test system, and then registers this differential pressure condition by slidable linear movement within the inner bore 42. The maximum length of travel of the differential piston 56 within the inner bore 42 is 0.5 inch with the minimum travel length of 0.2 inch in order to cover all possible conditions occurring within the test system when a differential pressure condition results. The piston 56 has a face end comprising a circular-shaped recess 58 bounded by a slightly projecting annular rim 60. The recess 58 extends a slight distance within the face end of the piston 56. Opposite the face end of the piston 56 is a circular recessed seating end 62. The seating end 62 of the piston 56 has a smaller diameter than the major portion of the piston 56 adjacent the face end thereof, and the piston 56 itself is shaped to fit within the inner bore 42 of the first member 32. In addition, the piston 56 includes an interior piston bore 64 extending from the seating end 62 approximately one-third of the way into the piston 56 and concentric thereto. Perpendicular to the bore 64 and extending through the body of the piston 56 is a lateral piston passage 66. The passage 66 is in flow communication with the bore 64 and the cavity 44 of the bore 42.

Mounted adjacent the seating end 62 of the piston 56 is a cylindrical guide ring 68 preferably composed of a plastic or plastic-type material, such as Teflon. The guide ring 68 is interposed between the surface of the piston 56 and the bore 42 of the first member 32 and is generally impervious to fluid flow. The piston 56 does not ride upon the bore 42 of the first member 32 because of the interposition therebetween of the guide ring 68 and the cup seal 54; thus galvanic corrosion that would otherwise occur is prevented. The corrosive effects of metals having different chemical compositions contacting one another is avoided by the interposition of the guide ring 68 and the cup seal 54 between the body of the piston 56 and the bore 42.

Mounted within the recess 58 of the differential piston 56 is a magnet 70 for producing a local magnetic field. In order to protect the magnet 70 from the effects of water, a plastic cap 72 is affixed to the magnet 70; the plastic cap 72, which resembles a small cup, is glued onto the magnet 70 and then the magnet 70 is affixed (by gluing) to the recess 58 and pressed therein for a secure and snug fit. The pressure switch 10 also includes a first spring biasing means for effecting the slidable axial movement of the piston 56 within the bore 42. As shown in FIGS. 1-4, the first biasing means includes a first compression spring 74 having one end positioned within the annular seat 46 and a second end positioned in the seating end 62 of the piston 56. Depending upon what condition occurs within the test system during testing of the workpiece 16, the spring 74 can urge the piston 56 toward the second end 38 or the spring 74 can be disposed to a yieldably resisting state in response to the piston 56 moving toward the annular seat 46 as a result of a differential pressure condition occurring within the test system, overcoming the spring 74, and forcing the piston 56 toward the first end 34.

Illustrated in FIGS. 1-4 is a second tubular-shaped member 76 of a generally elongated and cylindrical structure and having the same diameter as the first member 32 but slightly shorter in length. The second member 76 is also preferably manufactured from brass and is axially aligned with and adapted for removable securement to the first member 32. The second member 76 includes a substantially closed distal end 78 having a flat cylindrical exterior face 80 and an opposite annular rim 82 integrally formed from and projecting outwardly from the main body of the second member 76. The rim 82 is axially aligned with the second member 76 and is adapted to snugly and slidably fit within and contiguous to the second end 38 of the first member 32. Located on the rim 40 of the second end 38 are three spaced-apart threaded receiving holes (not shown), and located on the face 80 of the second member 76 are three spaced-apart mounting holes (not shown) which are aligned with the three receiving holes on the first member 32. The three mounting holes on the second member 76 extend along the length thereof and terminate at an annular ledge 84 where the rim 82 begins so that fasteners, such as mounting bolts or screws, can be inserted therethrough and into each respective receiving hole on the first member 32. The pressure switch 10 of the present invention with three mounting holes and three receiving holes is rated at 600 psi.; if the number of mounting holes and receiving holes is doubled, the pressure switch 10 can be rated up to 3,000 psi. With only three mounting holes and three receiving holes the pressure switch 10 is generally capable up to 1,500 psi., and the additional three mounting holes and three receiving holes increase the tensile strength which allows the pressure switch 10 to be rated up to 3,000 psi.

The second member 76 also includes a cylindrical chamber 86 formed within the body of the second member 76 registering with the open area bounded by the annular rim 82 and having an interior end 88. The second member 76 includes a lateral feeder inlet passage 90 extending from the external face 80 at the closed distal end 78 into and through the body of the second member 76, registering and in flow communication with the open area bounded by the rim 82. As shown in FIGS. 1-4, the passage 90 extends parallel with the chamber 86 and has substantially the same length as the second member 76. The passage 90 is connected to piping coming off the inlet feeder piping 12 and is in flow communication therewith. In addition, at least one lateral countersunk bore or passage 92 extends from the surface of the second member 76 substantially thereinto. The countersunk bore 92 is located adjacent the distal end 78 and is adapted to threadably receive a threaded bolt 94 or set screw, whose purpose and function will be more fully described hereinafter. The second member 76 also includes an elongated passage 96 which extends from the external face 80 at the distal end 78 into the body of the second member 76 and registers with the chamber 86 at an interior passage opening 98. The passage 96 is centrally located within the body of the second member 76 and concentric therewith. The countersunk bore 92 perpendicularly intersects the passage 96 near the distal end 78. A cylindrical elongated support member 100 is inserted into the passage 96 and projects substantially into the chamber 86. More specifically, the support member 100 is a cylindrical aluminum stub, sheath, or sleeve which is slid into the passage 96 for snug and secure mounting. The support member 100, such as the aluminum stub, is adapted for removable and adjustable placement within the passage 96. Moreover, to secure the support member 100 in place within the second member 76, the bolt 94 can be threadably inserted into the countersunk bore 92 and tightened down upon the cylindrical surface of the support member 100 to firmly hold it in place.

Disposed within the second member 76, within the chamber 86 and the open area, is a pre-set piston 102. The pre-set piston 102 is disposed for slidable axial movement therein and is in opposed concentric relationship with the differential piston 56 when the pressure switch 10 is fully assembled and operative. The pre-set piston 102 is preferably manufactured from brass and has a cup-shaped elongate structure having a flat circular face end 104 and an interior bore 106 extending substantially therethrough. When the support member 100 is inserted into the passage 96 and projects substantially into the chamber 86, the support member 100 is encompassed by the interior bore 106 of the pre-set piston 102. The pre-set piston 102 is a gross indicator of pressure and is not as sensitive as the differential piston 56.

The piston 102 is utilized to register and sense a minimum predetermined static pressure within the test system. In the test system of the present invention, a minimum predetermined static pressure of 50 psi. is required for the proper functioning of the pressure switch 10. FIG. 1 shows the pressure switch 10 disposed in what may be called the switch inactive and no pressure on test specimen or workpiece condition. The piston 102 extends substantially into the open area bounded by the rim 82 forcing the piston 56 to move toward the annular seat 46 of the first member 32. As shall be explained more fully hereinafter, this position would cause an indicator light (not shown) to go off because the piston 56 has been forced into a differential position by the linear movement of the piston 102.

As shown in FIGS. 1-3, a second spring biasing means is utilized for effecting the slidable axial movement of the pre-set piston 102. The second spring biasing means includes a second compression spring 108 disposed within the chamber 86 and having one end seated within an inner circular seat 110 formed within the body of the second member 76 at the interior end 88 of the chamber 86. The seat 110 is circumjacent the opening 98 of the passage 96. The second compression spring 108 is disposed within the chamber 86 so that it encircles and is circumjacent to a portion of the support member 100 projecting into the chamber 86 and, in addition, the spring 108 is substantially encompassed by and fits within the interior bore 106 of the piston 102. When there is no pressure within the test system on the low pressure side and no pressure on the high pressure side, the spring 108 urges the pre-set piston 102 toward the differential piston 56, overcoming the spring 74, and forcing the piston 56 toward the first end 34 of the first member 32 as shown in FIG. 1. When both sides of the test system are brought to a minimum predetermined static pressure of 50 psi., the differential piston 56, due to the equalizing of pressure of both sides of the test system, moves away from the first end 34 and toward the second member 76. The pressure exerted on the piston 102 overcomes the tension of the spring 108 and the pre-set piston 102 backs into the chamber 86 as the pressure is equalized to 50 psi. The piston 102 moves to a position as shown in FIG. 2. Then pressure within the system maintains the position of the piston 102 as shown in FIG. 2 when a predetermined minimum static pressure is attained. Then the biasing spring 74 moves the piston 56 to its normal no differential position. The operator must visually check and monitor the pressure gauge and the indicator light or lights to insure that a minimum static pressure is attained and that no differential pressure condition has occurred within the test system. It should be noted that this function could be computerized. Mounted to the piston 102, opposite the face end 104, is a cylindrical ring 112, such as an O-ring, for blocking external pressure on the support member 100.

An electrical signaling means is disposed within the pressure switch 10 and is electrically connected to an external indicator means, such as a light or panel of lights (which may also include LED lights), for permitting the operator to visually determine when the workpiece, i.e., the test specimen, has failed. More specifically, the electrical signaling means is emplaced within the support member 100 and has electrical lead wires 114 extending out to the external pipe testing equipment on which the indicator light or lights are mounted.

The preferred electrical signaling means of the present invention is a proximity detector such as a reed switch 116 which is conventional and well known in the art. Reed switches come in a wide variety of shapes, sizes, and magnetic sensitivities; for the pressure switch 10 of the present invention, the reed switch 116 utilized is disposed within a cylindrical, hard plastic casing. Using this type of reed switch allows for slidable insertion within the support member 100. The reed switch 116 has two metallic fingers or springs spaced a slight distance apart. When the reed switch 116 comes under the influence of a local magnetic field, the fingers close and conduct electricity and the reed switch is on; when the local magnetic field moves away, the distance being determined by the particular reed switch being used and the strength of the magnetic field, the fingers move apart and are thus disposed in a nonconducting, nonsignaling state. In effect, the reed switch 116 is shut off.

The reed switch 116 utilized in the present invention is actuated at 0.2 inch of travel: when the magnet 70 mounted to the piston 56 moves 0.2 inch further away from the reed switch 116 positioned within the support member 100, the magnetic field falls off and the reed switch 116 opens up and is no longer conducting electricity. When the face end of the piston 56 is opposite the face end 104 of the piston 102, as shown in FIGS. 1 and 2, and there is a ⅛ inch gap between the face end 104 and the magnet 70, the magnetic field causes the reed switch 116 to be in the conducting or signaling state and the reed switch 116 is on. When the reed switch 116 is on, the indicator light or lights to which is it electrically connected in circuit will also be on, indicating that the workpiece 16 has not failed. When a differential pressure condition occurs within the test system as a result of the workpiece 16 failing and developing a leak, the differential piston 56 will back away from the pre-set piston 102 and, thus, the magnetic field will fall off causing the reed switch 116 to open up. The reed switch 116 is now in the nonconducting, nonsignaling state and is off. This causes the indicator light or lights to which the reed switch 116 is electrically connected to also shut off, thus indicating that the workpiece 16 developed a leak which was detected and failed the test. The reed switch 116 is disposed within the support member 100 so that it is generally placed adjacent and flush with the internal end of the support member 100. The reed switch 116 may be partially glued or potted into the support member 100 so that the reed switch 116 can be linearly adjusted therein to different settings and sensitivities and yet remains stationary within the support member 100 once a particular setting is attained. In other words, the reed switch 116 does not have to be adjacent the internal end of the support member 100 but can be pulled back a distance therefrom so as to vary its sensitivity to the magnetic field of the magnet 70.

As shown in FIGS. 1-4, a means to bleed air out of the test system is included so as to remove any air pockets or vacuums that may be in the test system and that would adversely affect any test. The bleeding means is a bleeder valve 118 located on the workpiece testing stand in flow communication with the workpiece 16. Opening the valve 118 simply allows air to escape as the test system is being filled with fluid.

The operation of the pressure switch 10, with reference to FIGS. 1-3, will now be described. The workpiece 16 to be tested is mounted on the test stand and a medium is introduced into the test system. One preferred medium is a fluid, such as water. After residual air is bled out of the test system by the use of the bleeder valve 118, the metering valve 18 is calibrated to a predetermined set point. A preferred set point for the present invention is a flow setting of 32 cubic centimeters per minute at 150 psi. within the test system. The metering valve 18 employed in the test system can be calibrated within a range, for example, of 5 to 30 or 40 cubic centimeters per minute of leak detection rate by either closing or opening the orifice 20 of the valve 18. The fluid in the test system is static, the pre-set piston 102 has moved away from the reed switch 116 and the support member 100, and the differential piston 56 has consequently been forced away to show a no pressure condition occurring within the test system. The magnetic field has thus moved away from the reed switch 116 and the force of the second compression spring 108 has overcome the first compression spring 74 to show a no pressure condition. The indicator light would go out indicating that the workpiece 16 has inadequate minimum pressure in the test system.

As the workpiece 16 shown in FIG. 1 has not developed a leak, this indicates that the workpiece 16 is actually not under pressure and the test system needs to be brought to an appropriate predetermined static test pressure. A predetermined minimum static pressure of 50 psi. introduced throughout the test system will cause piston 102 to overcome the force exerted by the second compression spring 108, thus forcing the piston 102 back toward the support member 100 and the reed switch 116, and allowing the piston 56 to go to a position shown in FIG. 2 by the force of spring 74. With the face end of the piston 56 immediately opposed the piston 102, the magnetic field of the magnet 70 would force the reed switch 116 to the conducting or signaling state and the indicator light would be on. Pressure would now be equalized throughout the test system to at least a predetermined minimum pressure of 50 psi. , and the reed switch 116 would be in the conducting state indicating no differential pressure condition existing within the test system. Thus, the two necessary conditions requisite for testing to occur have now been detected and verified: there is at least a minimum static pressure of 50 psi. within the test system, and no differential pressure condition exists so that the reed switch 116 is on and the indicator light to which it is electrically connected is also on. A timer (not shown) can be activated and the test can commence.

As was noted earlier, the piston 56 only detects when a differential pressure condition exists within the test system; for example, if there is 0 psi. on what was aforedescribed as the high pressure side of the test system and 0 psi. on what was described as the low pressure side of the test system, or if there is 200 psi. on both the high and low pressure sides of the test system, the piston 56 is not responsive to such conditions. The piston 56 does not sense a lack of adequate pressure or an unpressurized condition within the test system. With the valve calibrated at a predetermined set point, one preferred set point being a flow setting of 32 cubic centimeters per minute, and the test system brought up to a predetermined test pressure, one preferred test pressure being 150 psi. within the test system, the test can begin. Pressure is now equalized throughout the test system and the test pressure being exerted on the workpiece 16 is the same as the pressure coming into the high pressure side of the test system through the inlet feeder pipe 12. With the timer running, the workpiece 16 is subjected to the test pressure until it fails and develops a leak.

As shown in FIG. 3, a differential pressure condition now exists wherein the pressure on the low pressure side of the test system falls off, the piston 56 detects the pressure differential caused by the leak and is forced away from the piston 102 as a result of the fluid coming in from the inlet passage 90 filling the chamber 86 and overcoming the spring 74, thus causing the piston 56 to back away from the piston 102. This drop in pressure occurs simultaneously across the orifice 20 of the metering valve 18 with the occurrence of the leak in the workpiece 16 and the amount of fluid crossing the orifice 20 to the low pressure side of the test system is equal to the amount of fluid leaking from the workpiece 16. The test pressure on the high pressure side of the test system has not fallen off and remains constant due to its independent mechanical or electronic pressure control system.

The differential piston 56 detects the leak and is forced away from the pre-set piston 102 by the pressure differential in the system; thus the magnet 70 also moves away from the reed switch 116. With the magnetic field falling off and consequently removed, the reed switch 116 opens up to the nonconducting, nonsignaling state thus shutting off the indicator light and telling the operator that the workpiece 16 has failed the test. As a result of the leak in the workpiece 16 there is now fluid flow in the test system, as shown in FIG. 3. There is a slight fluid flow through the inlet passage 50 which enters the interior bore 64 at the seating end 62 and then flows through the piston passage 66 into the cavity 44, then the outlet passage 52, and through the outlet piping 28 connected thereto. Depending upon the test pressure being exerted upon the workpiece 16, the type of workpiece being tested, and the calibration of the valve 18, a wide variety of differential pressure conditions can be detected by the pressure switch 10 of the present invention. For example, if a test pressure of 3,000 psi. is exerted on both sides of the test system and also on the workpiece 16, a drop of 15 psi. on the low pressure side as a result of the workpiece 16 developing a leak would cause the pressure in the test system on the low pressure side to drop to 2,985 psi., and would be detected by the piston 56. Thus, a prominent advantage of the pressure switch 10 is its extremely high capability and extreme repeatability ranging from very low differential pressure conditions to extremely high differential pressure conditions. The axial relationship between the differential piston 56 and the pre-set piston 102 results in an extremely high repeatability in testing and extreme accuracy in test results as well as extreme sensitivity to a very small pressure drop on the low pressure side.

Figure 5:
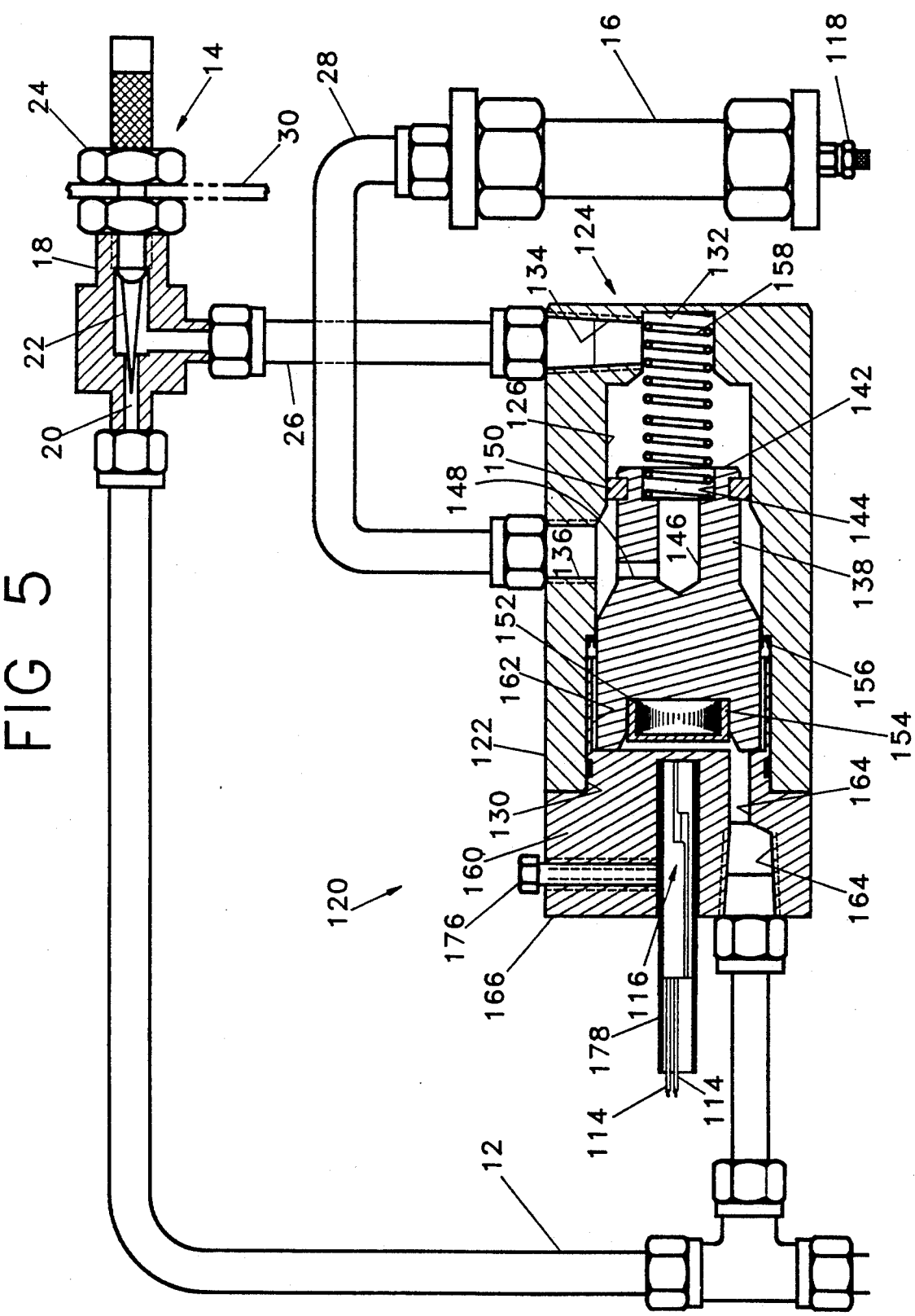
FIG. 5 is a cross-sectioned elevational view of an alternate embodiment of a pressure switch.
Figure 6:
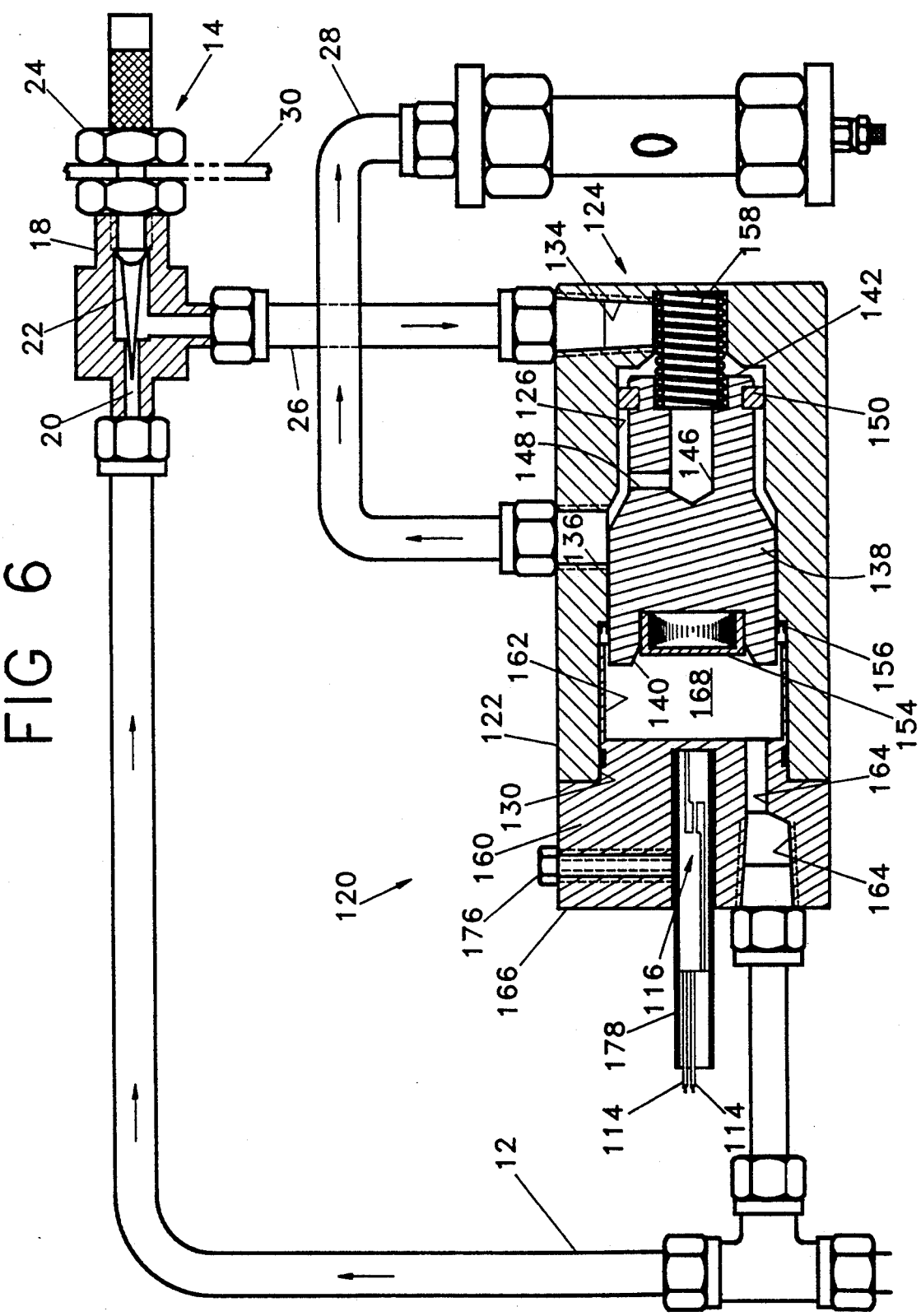
FIG. 6 is a cross-sectioned elevational view of the switch first shown in FIG. 5 illustrating a leak condition detected by the pressure switch.
Figure 7:
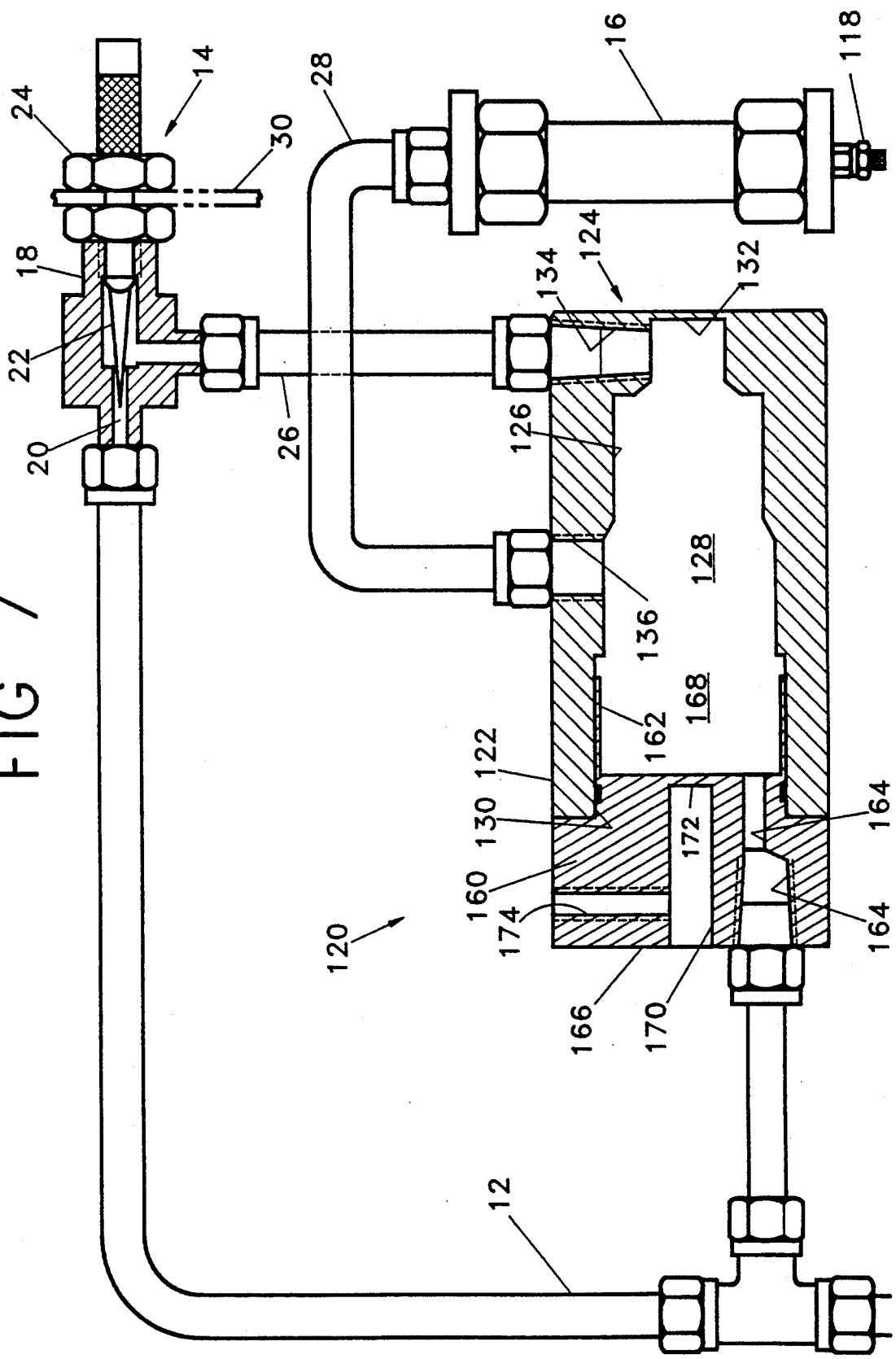
FIG. 7 is a cross-sectioned elevational view of the switch first shown in FIG. 5 with certain internal structural components removed.

An alternate embodiment of the pressure switch of the present invention is shown in FIGS. 5–7. FIGS. 5 and 6 illustrate a differential pressure switch 120 for detecting a differential pressure condition occurring within the test system. The pressure switch 120 can only detect when a differential pressure condition exists within the test system; it cannot detect whether there is a minimum predetermined pressure within the test system or no pressure at all within the test system or if the workpiece is not being subjected to a proper working pressure due to the fact that the operator omitted turning on the valve 18 to equalize pressure on both the high pressure and the low pressure sides of the test system. The pressure switch 120 shown in FIGS. 5 and 6 may be referred to as a pure differential pressure switch.

The pressure switch of the alternate embodiment shown in FIGS. 5–7 includes a cylindrical, elongated, tubular-shaped member 122 closed at a first end 124 and having an inner bore 126 defining a cavity 128 and extending substantially therethrough to an open annular second end 130. The diameter of the bore 126 is not uniform throughout but is stepped at several points through its length. An interior recessed pocket 132 is formed within the inner bore 126 adjacent to the closed first end 124 and is in flow communication with a lateral inlet passage 134 extending from the recessed pocket 132 to the external surface of the body of the tubular-shaped member 122. Located at roughly the mid-point of the tubular-shaped member 122 is a lateral outlet passage or bore 136 which is in flow communication with the cavity 128 of the inner bore 132 and extends through the body of the tubular-shaped member 122 to the external surface thereof.

Disposed within the inner bore 126 is a generally cylindrical, elongated differential piston 138 having a recessed face end 140 and an opposite seating end 142. The differential piston 138 is tapered somewhat so that the diameter of the portion of the differential piston 138 at the seating end 142 is smaller than the diameter at the face end 140. Formed at the seating end 142 is a circular, recessed pocket 144 and extending into the body of the differential piston 138 concentric with the piston 138 is an interior bore 146 which communicates with the pocket 144. Extending through and located midway in the piston 138 is a lateral piston bore 148 which is in flow communication with the bore 146 and the cavity 128 of the inner bore 126. Fluid flow can enter the pocket 144 of the piston 138 and flow into the interior bore 146, through the lateral bore 148, and then through the outlet bore 136 of the tubular-shaped member 122 to outlet piping 28 located on the low pressure side of the test system.

The piston 138 is adapted for slidable, reciprocable, axial movement within the inner bore 126 of the tubular-shaped member 122. Mounted adjacent the seating end 142 of the piston 138 is a Teflon, or other suitable plastic or bearing material, guide ring 150. The guide ring 150 is interposed between the surface of the piston 138 and the inner bore 126 of the tubular-shaped member 122. The piston 138 is preferably manufactured from stainless steel, and the tubular-shaped member 122 is preferably manufactured from bronze; the piston 138 thus rides on the guide ring 150 as opposed to riding upon the bronze inner bore 126 of the tubular-shaped member 122. Thus, the corrosive effects of metals having different chemical compositions contacting one another is avoided by the interposition of the guide ring 150 between the piston 138 and the inner bore 126. Mounted into the recess at the face end 140 of the piston 138 is a magnet 152 for inducing a local magnetic field. Preferably the magnet 152 is glued within the face end 140. In order to protect the magnet 152 from water, for example, a plastic cap 154, shaped like a cup, is first mounted to the magnet 152 by being glued thereon and then the magnet 152 with the plastic cap 154 affixed thereto is pressed and mounted within the recess at the face end 140 of the piston 138. An annular cup seal 156 is mounted to the inner bore 126 adjacent the open annular second end 130. The cup seal 156 also provides a surface upon which the piston 138 can ride so as not to contact the inner bore 126. Thus, during slidable reciprocal movement within the inner bore 126, the piston 138 rides upon plastic surfaces interposed between the piston 138 and the inner bore 126.

The piston 138 is adapted for detecting a differential pressure condition occurring within the test system and functions in the same manner as the piston 56 of the preferred embodiment of the present invention. A compression spring 158 is mounted within the cavity 128 of the inner bore 126. A first end is mounted into the recessed pocket 132 of the inner bore 126 and the second end is positioned within the pocket 144 of the piston 138 located at the seating end 142 thereof. When a differential pressure condition exists within the test system as a result of the workpiece 16 developing a leak, the pressure existing within the test system at the high pressure side overcomes the force of the compression spring 158 and forces the piston 138 to slidably move toward the closed first end 124 of the tubular-shaped member 122.

FIGS. 5–7 illustrate a generally cylindrical member 160 having a projecting annular rim 162, of a smaller diameter than the cylindrical member 160, integrally formed thereon and projecting outwardly therefrom. The cylindrical member 160 is adapted for axial securement to the tubular-shaped member 122; more specifically, the annular rim 162 of the cylindrical member 160 is adapted for slidable insertion and reception within and contiguous to the open annular second end 130 of the tubular-shaped member 122. The slidable insertion produces a snug fitting between the cylindrical member 160 and the tubular-shaped member 122. The tubular-shaped member 122 has a plurality of spaced-apart receiving holes (not shown) located on the face of the open annular second end 130, and the cylindrical member 160 has a plurality of spaced-apart threaded screw holes (not shown) axially extending along the length of the cylindrical member 160. When assembling the cylindrical member 160 to the tubular-shaped member 122, the threaded screw holes are aligned with the receiving holes so that mounting bolts or screws can be inserted through the threaded holes and into the receiving holes. Tightening the securing bolts causes a secure assemblage of the cylindrical member 160 to the tubular-shaped member 122.

As shown in FIGS. 5–7, the cylindrical member 160 also includes an inlet passage 164 that extends from the surface of a flat, exterior, distal end 166 into and through the body of the cylindrical member 160 where it registers in flow communication with an interior cavity 168 formed by the annular rim 162. Piping on the high pressure side of the test system is connected to the inlet passage 164 so that flow communication from the inlet feeder pipe 12 at the high pressure side of the test system into the inlet passage 164 can occur. Centrally located and extending substantially through the body of the cylindrical member 160 is an elongated sleeve or passage 170 closed at an interior end 172. The passage 170 is concentric with the cylindrical member 160 when the cylindrical member 160 is secured to the tubular-shaped member 122. Located adjacent the distal end 166 and extending from the surface and substantially into the body of the cylindrical member 160 is a threaded, elongated securing hole 174. The threaded hole 174 is perpendicular to the passage 170, registers therewith, and is adapted to receive a mounting bolt or screw 176.

An electrical signaling means is emplaced within the passage 170 so that electrical signaling is actuated by the proximity of the magnetic field to the electrical signaling means for indicating whether or not a differential pressure condition exists within the test system. The electrical signaling means is disposed in a nonsignaling, nonconducting state when the magnetic field moves a predetermined distance away from the electrical signaling means as a result of the piston 138 backing away from the electrical signaling means and moving toward the closed first end 124 upon detecting a differential pressure occurring within the test system. The electrical signaling means of the alternate embodiment is the same as the electrical signaling means of the preferred embodiment: a proximity detector, such as a reed switch 116, which is electrically connected to the external testing equipment which includes pressure gauges, pressure regulators, indicator lights, which may include LED lights, and, as shown in FIGS. 5-7, the valve assembly 14 or valve arrangement which includes the metering valve 18 having an adjustable orifice 20. Also included in the testing equipment is a stand or fixture upon which, or in which, the workpiece 16 is placed for testing. Some means to bleed air from the test system before testing is to commence is also included.

The reed switch 116 used in the alternate embodiment of the pressure switch 120 is adapted for linear, slidable, adjustable emplacement within the passage 170 so that different settings and sensitivities can be attained. A common setting is to have the reed switch 116 abutting the closed interior end 172 of the passage 170. The reed switch 116 may be potted into the passage 170 by gluing but is still capable of linear adjustment within the passage 170. The reed switch 116 is emplaced within a tubular-shaped member 178, such as an aluminum tube or stub, and then slidably inserted and adjusted within the passage 170 to achieve a particular predetermined setting. Electrical lead wires 114 coming out of the reed switch 116 are electrically connected to the testing equipment so as to indicate when the reed switch 116 is in the conducting state and when it is disposed in the nonconducting, nonsignaling state, thus indicating whether or not a differential pressure condition exists within the test system as a result of the failure of the workpiece 16 being detected by the differential piston. The screw 176 threadably inserted into the threaded hole 174 can be used to firmly secure the aluminum tube 178 in place, thus fixing the reed switch 116 at that particular predetermined setting. The reed switch 116 is actuated at the same distance as in the preferred embodiment, i.e., when the differential piston 138 travels more than 0.2 inch, the magnetic field of the magnet 152 falls off and the reed switch 116 opens up, thus breaking the circuit and shutting off the indicator light, indicating that the workpiece 16 has developed a leak and the test has failed.

The manner of operation of the pressure switch 120 of the alternate embodiment is generally the same as that of the pressure switch 10 of the preferred embodiment. The major and significant difference is that the pressure switch 120 of the alternate embodiment does not include the pre-set piston 102 which is utilized as a gross indicator of pressure within the test system in the preferred embodiment. The pressure switch 120 of the alternate embodiment does not sense or detect an unpressurized condition within the test system. For example, if there is no pressure on the high pressure side and on the low pressure side of the test system, the piston 138 would move toward the reed switch 116 thus disposing the reed switch 116 to a conducting, signaling state and turning on the indicator light to which the reed switch 116 is electrically connected. The operator would interpret this as a good test when no pressure is on the workpiece 16. The piston 138 of the alternate embodiment cannot sense or detect when a minimum predetermined static pressure within the test system is attained; the piston 138 only detects a differential pressure condition occurring in the test system. Thus, a second static pressure switch is necessary to interrupt this signal when no pressure is in the test system. FIG. 6 illustrates the position of the piston 138 when a leak has occurred in the workpiece 16 and a differential pressure exists whereby the fluid flow coming into the inlet passage 164 forces the piston 138 to back away from the reed switch 116, overcoming the tension of the compression spring 158. With the magnetic field thus falling off and consequently removed, the reed switch 116 opens up and shuts off the indicator light thus telling the operator that a leak has developed and the workpiece 16 has failed the test. Fluid flow within the test system now results as there is a drop in pressure across the orifice 20 of the valve 18 and the flow across the orifice 20 is equal to the flow coming out of the leak in the workpiece 16.

Although the invention has been herein shown and described in what is conceived to be the most practical preferred embodiment and alternate embodiment, it is recognized that departures may be made therefrom within the scope of the invention.

I claim:

1. A combination differential and static pressure switch for detecting a differential pressure condition occurring in a test system, comprising:

a first tubular-shaped member closed at a first end and having an elongated cavity extending substantially therethrough from an annular seat at the closed first end to an open annular second end;

a second tubular-shaped member axially aligned with and adapted for removable securement to the first tubular-shaped member;

the second tubular-shaped member further characterized by having a substantially closed distal end, an elongated passage extending from the distal end substantially into the second tubular-shaped member concentric thereto, an annular rim having a smaller diameter than the second tubular-shaped member and projecting axially from the second tubular-shaped member opposite the distal end, the annular rim adapted to slidably fit within the open annular second end of the first tubular-shaped member, and a cylindrical chamber located between the elongated passage and the annular rim;

a pre-set piston positioned within the second tubular-shaped member and disposed for slidable axial movement therein, the pre-set piston capable of registering a minimum predetermined static pressure within the test system;

a differential piston having a face end and an opposite seating end slidably disposed within the inner bore and axially aligned with the pre-set piston, the differential piston detecting a differential pressure occurring within the test system;

a magnet mounted to the face end of the differential piston for producing a local magnetic field;

a cylindrical, elongated support member for removable and adjustable placement within the elongated passage of the second tubular-shaped member projecting into the cylindrical chamber and encompassed by the pre-set piston;

an electrical signaling means emplaced within the elongated support member actuated by the proximity of the magnetic field to a conducting and signaling on state; and the electrical signaling means further disposed to a nonsignaling, nonconducting off state when the magnetic field moves away from the electrical signaling means.

2. The pressure switch of claim 1 further comprising a lateral feeder inlet passage extending through the second tubular-shaped member and communicating with the cylindrical chamber for allowing flow therethrough and into the elongated cavity of the first tubular-shaped member when the second tubular-shaped member is fitted to the first tubular-shaped member and a differential pressure condition occurs in the test system.

3. The pressure switch of claim 1 further comprising an inlet passage extending through the first tubular-shaped member adjacent the closed first end for allowing flow into the inner bore of the first tubular-shaped member.

4. The pressure switch of claim 1 further comprising an outlet passage extending through the first tubular-shaped member adjacent the open annular second end and communicating with the inner bore for allowing flow out of the inner bore of the first tubular-shaped member.

5. The pressure switch of claim 1 further comprising a first biasing means for urging the differential piston toward the closed first end until a minimum static pressure is registered in the test system and yieldably resisting in response to a differential pressure forcing the differential piston toward the closed first end.

6. The pressure switch of claim 5 wherein the first biasing means includes a first compression spring extending between and abutting the seating end of the differential piston and the annular seat of the inner bore, the first compression spring yieldably compressing when a differential pressure forces the differential piston to back away from the pre-set piston.

7. The pressure switch of claim 1 further comprising a second spring-biasing means for urging movement of the pre-set piston toward the differential piston when the test system is not at a minimum static pressure.

8. The switch of claim 7 wherein the second biasing means includes a second compression spring disposed within the cylindrical chamber circumjacent a portion of the elongated support member and substantially encompassed by and fitting within the pre-set piston.

9. The pressure switch of claim 1 further comprising a cylindrical guide ring mounted to the differential piston adjacent the seating end and interposed between the differential piston and the inner bore for riding on the inner bore during slidable movement of the differential piston.

10. A differential pressure switch for detecting a differential pressure occurring in a test system, comprising:

a tubular-shaped member closed at a first end and having an inner bore extending substantially therethrough to an open annular second end;

a differential piston having a face end and an opposite seating end slidably disposed within the inner bore of the tubular-shaped member and axially aligned therewith, the differential piston capable of detecting a differential pressure occurring within the test system;

a magnet mounted at the face end of the differential piston for producing a local magnetic field;

a generally cylindrical-shaped member axially aligned with and adapted for removable securement to the tubular-shaped member;

the generally cylindrical member having an annular rim of a smaller diameter than the cylindrical member and projecting outwardly therefrom for slidable reception within the open annular second end of the tubular-shaped member;

an elongated sleeve extending substantially through the cylindrical member and concentric therewith;

an electrical signaling means emplaced within the elongated sleeve actuated by the proximity of the magnetic field to a conducting, signaling on state; and the electrical signaling means further disposed to a nonsignaling, nonconducting off state when the magnetic field moves away from the electrical signaling means as a result of the differential piston moving toward the closed first end upon detecting a differential pressure condition within the test system.

* * * * *